US012701569B2

(12) United States Patent
Yang et al.

(10) Patent No.: US 12,701,569 B2
(45) Date of Patent: Aug. 4, 2026

(54) WIRELESS COMMUNICATION WITH A GRANT ALLOCATING RESOURCES CORRESPONDING TO AT LEAST TWO TRANSPORT BLOCKS

(71) Applicant: QUALCOMM Incorporated, San Diego, CA (US)

(72) Inventors: Wei Yang, San Diego, CA (US); Linhai He, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/448,160

(22) Filed: Aug. 10, 2023

(65) Prior Publication Data

US 2024/0057079 A1      Feb. 15, 2024

Related U.S. Application Data

(60) Provisional application No. 63/371,378, filed on Aug. 12, 2022.

(51) Int. Cl.
H04W 72/1268      (2023.01)
H04W 72/21      (2023.01)

(52) U.S. Cl.
CPC ....... H04W 72/1268 (2013.01); H04W 72/21 (2023.01)

(58) Field of Classification Search
CPC ............. H04W 74/00; H04W 72/0446; H04W 72/1268; H04W 72/21; H04W 72/1273; H04W 72/232; H04L 1/00; H04L 1/1822
See application file for complete search history.

(56) References Cited

U.S. PATENT DOCUMENTS 11,271,699 B1 *    3/2022   Eyuboglu ............ H04J 11/0079
2020/0220693 A1    7/2020   Babaei et al.
2021/0168768 A1 *  6/2021   Bae ........................ H04W 72/23
2021/0368501 A1   11/2021   Hamidi-Sepehr et al.
(Continued)

FOREIGN PATENT DOCUMENTS

EP           2244515 A1    10/2010

OTHER PUBLICATIONS

ERICSSON: "Report on [100#38][MTC/NB-IOT] Padding Issue in Msg3", 3GPP TSG-RAN WG2 #101, R2-1803077, 3rd Generation Partnership Project, Mobile Competence Centre, 650, Route Des Lucioles, F-06921 Sophia-Antipolis Cedex, vol. RAN WG2, No. Athens, Greece, Feb. 26, 2018-Mar. 2, 2018, 24 Pages, Feb. 15, 2018, XP051399924, Section 3.2, p. 9-p. 13.

(Continued)

*Primary Examiner* — Iqbal Zaidi
(74) *Attorney, Agent, or Firm* — ArentFox Schiff, LLP

(57)      ABSTRACT

An apparatus may be configured to obtain a grant allocating a set of resources on which to transmit at least two transport blocks (TBs) using multiple spatial layers; determine whether a data size of data available to be carried on the set resources is sufficient for at least one TB of the at least two TBs; and based on a determination of whether the data size of the data is sufficient for the at least one TB of the at least two TBs, one of: transmit, to a network entity, the at least one TB of the at least two TBs on the set of resources allocated by the grant, or skip the grant.

23 Claims, 10 Drawing Sheets

(56) References Cited

U.S. PATENT DOCUMENTS

2023/0403661 A1 * 12/2023 Kim ................... H04W 56/001

OTHER PUBLICATIONS

Intel Corporation: "Early Data Transmission for feNB-IoT", 3GPP TSG RAN WG1 Meeting #92bis, R1-1804699, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, pp. 1-5, XP051426966, table 1, Sections 2, 3, 5, p. 2-p. 5.
International Search Report and Written Opinion—PCT/US2023/072121—ISA/EPO—Oct. 25, 2023.

* cited by examiner

Grant allocating a set of resources on which to transmit at least two TBs using at least four spatial layers

802

Transmitting, to a UE, a grant allocating a set of resources on which to transmit at least two TBs using multiple spatial layers

804

Based on the grant, one of:
(1) receiving at least one TB of the at least two TBs from the UE on the set of resources, or
(2) determining the grant is skipped by the UE

800

1000

1002

104

Reception Component
1030

Determination Component
1042

Grant Component
1040

Communication Manager 1032

Transmission Component
1034

Baseband Unit 1004

WIRELESS COMMUNICATION WITH A GRANT ALLOCATING RESOURCES CORRESPONDING TO AT LEAST TWO TRANSPORT BLOCKS

CROSS REFERENCE TO RELATED APPLICATION(S)

This application claims the benefit of U.S. Provisional Application Ser. No. 63/371,378, entitled "WIRELESS COMMUNICATION WITH A GRANT ALLOCATING RESOURCES CORRESPONDING TO AT LEAST TWO TRANSPORT BLOCKS" and filed on Aug. 12, 2022, the disclosure of which is expressly incorporated by reference herein in its entirety.

BACKGROUND

Technical Field

The present disclosure generally relates to communication systems, and more particularly, to communication between a user equipment (UE) and a network entity on resources corresponding to at least two transport blocks (TBs) allocated by a grant from a network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by the 3$^{rd}$ Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or a component thereof. The apparatus may be configured to obtain a grant allocating a set of resources on which to transmit at least two transport blocks (TBs) using multiple spatial layers; determine whether a data size of data available to be carried on the set resources is sufficient for at least one TB of the at least two TBs; and based on a determination of whether the data size of the data is sufficient for the at least one TB of the at least two TBs, one of: transmit, to a network entity, the at least one TB of the at least two TBs on the set of resources allocated by the grant, or skip the grant.

In another aspect of the disclosure, another method, another computer-readable medium, and another apparatus are provided. The other apparatus may be a network entity or a component thereof. The other apparatus may be configured to transmit, to a UE, a grant allocating a set of resources on which to transmit at least two TBs using multiple spatial layers; and based on the grant, one of: receive at least one TB of the at least two TBs from the UE on the set of resources, or determine the grant is skipped by the UE.

In an aspect of the disclosure, a method of wireless communication at a user equipment (UE) is provided. The method comprises: obtaining a grant allocating a set of resources on which to transmit at least two transport blocks (TBs) using multiple spatial layers; determining whether a data size of data available to be carried on the set resources is sufficient for at least one TB of the at least two TBs; and based on determining whether the data size of the data is sufficient for the at least one TB of the at least two TBs, one of: transmitting, to a network entity, the at least one TB of the at least two TBs on the set of resources allocated by the grant, or skipping the grant.

In some aspects, the method further comprises: mapping the data available to be carried on the set of resources into the at least one TB of the at least two TBs; and padding at least one other TB of the at least two TBs, wherein each of the at least two TBs is transmitted to the network entity based on the grant. In some aspects, at least one of: the at least one TB is associated with a first TB index that is lower than a second TB index with which the at least one other TB is associated, the at least one TB includes uplink control information (UCI) that is absent from the at least one other TB, a first capacity of the at least one TB is greater than a second capacity of the at least one other TB and the data size of the data is greater than the second capacity but less than or equal to the first capacity, the at least one TB is configured with a first modulation and coding scheme (MCS) that is different than a second MCS with which the at least one other TB is configured, the at least one TB is associated with a first spectral efficiency that is different than a second spectral efficiency with which the at least one other TB is associated, or the at least one other TB is associated with a first rank that is different than a second rank with which the at least one other TB is associated.

In some aspects, skipping the grant comprises: refraining from transmitting on the set of resources allocated by the grant.

In some aspects, skipping the grant is based on at least one of: failure to obtain a medium access control (MAC) protocol data unit (PDU) from a MAC buffer, another set of resources allocated to uplink control information (UCI) overlapping with the set of resources allocated by the grant, a radio resource control (RRC) configuration received from the network entity, or a type of the grant.

In some aspects, the method further comprises: mapping the data available to be carried on the set of resources into the at least one TB of the at least two TBs, wherein the data size of the data is less than or equal to a first capacity of the at least one TB; and refraining from transmitting at least one other TB of the at least two TBs.

In some aspects, the method further comprises: mapping uplink control information (UCI) onto the set of resources allocated by the grant; and padding each of the at least two TBs, wherein the data size of the data available to be carried on the set of resources is zero, and wherein each of the at least two TBs is transmitted to the network entity.

In some aspects, the method further comprises: transmitting, to the network entity, at least one of first information identifying the at least one TB of the at least two TBs onto which the data is mapped or second information indicating a number of the at least one TB of the at least two TBs onto which the data is mapped. In some aspects, the at least one of the first information or the second information is included in uplink control information (UCI) that is piggybacked on the at least one TB of the at least two TBs.

In some aspects, the one of transmitting the at least one TB of the at least two TBs on the set of resources allocated by the grant, or skipping the grant is further based on at least one prioritization parameter for a logical channel.

In some aspects, the at least one prioritization parameter for the logical channel comprises at least one of a first prioritization parameter associated with a configured grant or a second prioritization parameter associated with a dynamic grant.

In some aspects, the set of resources is configured on a physical uplink shared channel (PUSCH).

In some aspects, the grant comprises one of a dynamic grant or a configured grant.

In an aspect of the disclosure, a method of wireless communication at a network entity is provided. The method comprises: transmitting, to a user equipment (UE), a grant allocating a set of resources on which to transmit at least two transport blocks (TBs) using multiple spatial layers; based on the grant, one of: receiving at least one TB of the at least two TBs from the UE on the set of resources, or determining the grant is skipped by the UE.

In some aspects, the method further comprises: decoding the at least one TB of the at least two TBs to obtain data mapped onto the at least one TB of the at least two TBs, wherein at least one other TB of the at least two TBs includes padding.

In some aspects, at least one of: the at least one TB is associated with a first TB index that is lower than a second TB index with which the at least one other TB is associated, the at least one TB includes uplink control information (UCI) that is absent from the at least one other TB, a first capacity of the at least one TB is greater than a second capacity of the at least one other TB and a data size of the data is greater than the second capacity but less than or equal to the first capacity, the at least one TB is configured with a first modulation and coding scheme (MCS) that is different than a second MCS with which the at least one other TB is configured, the at least one TB is associated with a first spectral efficiency that is different than a second spectral efficiency with which the at least one other TB is associated, or the at least one TB is associated with a first rank that is different than a second rank with which the at least one other TB is associated.

In some aspects, determining the grant is skipped by the UE is based on each of the at least two TBs being absent from the set of resources allocated by the grant.

In some aspects, determining the grant is skipped by the UE is based on at least one of: an absence of a medium access control (MAC) protocol data unit (PDU) from the UE, another set of resources allocated to uplink control information (UCI) overlapping with the set of resources allocated by the grant, a radio resource control (RRC) configuration transmitted to the UE, or a type of the grant.

In some aspects, receiving the at least one TB of the at least two TBs from the UE on the set of resources comprises: receiving the at least one TB of the at least two TBs, wherein a data size of data mapped onto the at least one TB is less than or equal to a capacity of the at least one TB, and wherein an other TB of the at least two TBs is absent from the set of resources allocated by the grant.

In some aspects, receiving the at least one TB of the at least two TBs from the UE on the set of resources comprises: receiving uplink control information (UCI) mapped onto the at least one TB of the at least two TBs, wherein each of the at least two TBs includes padding.

In some aspects, the method further comprises: receiving, from the UE, at least one of first information identifying the at least one TB of the at least two TBs onto which data is mapped or second information indicating a number of the at least one TB of the at least two TBs onto which the data is mapped.

In some aspects, the at least one of the first information or the second information is included in uplink control information (UCI) that is piggybacked on the at least one TB of the at least two TBs.

In some aspects, the one of receiving at least one TB of the at least two TBs from the UE on the set of resources or determining the grant is skipped by the UE is further based on at least one prioritization parameter for a logical channel.

In some aspects, the at least one prioritization parameter for the logical channel comprises at least one of a first prioritization parameter associated with a configured grant or a second prioritization parameter associated with a dynamic grant.

In some aspects, the set of resources is configured on a physical uplink shared channel (PUSCH).

In some aspects, the grant comprises one of a dynamic grant or a configured grant.

In an aspect of the disclosure, an apparatus for wireless communication at a user equipment (UE) is provided. The apparatus comprises: means for obtaining a grant allocating a set of resources on which to transmit at least two transport blocks (TBs) using multiple spatial layers; means for determining whether a data size of data available to be carried on the set resources is sufficient for at least one TB of the at least two TBs; means for transmitting, to a network entity, the at least one TB of the at least two TBs on the set of resources allocated by the grant when the data size of the data is sufficient for the at least one TB of the at least two TBs; and means for skipping the grant when the data size of the data is insufficient for the at least one TB of the at least two TBs.

In an aspect of the disclosure, the apparatus further comprises: means for mapping the data available to be carried on the set of resources into the at least one TB of the at least two TBs; and means for padding at least one other TB of the at least two TBs, wherein each of the at least two TBs is transmitted to the network entity based on the grant.

In an aspect of the disclosure, at least one of: the at least one TB is associated with a first TB index that is lower than a second TB index with which the at least one other TB is associated, the at least one TB includes uplink control information (UCI) that is absent from the at least one other TB, a first capacity of the at least one TB is greater than a second capacity of the at least one other TB and the data size of the data is greater than the second capacity but less than or equal to the first capacity, the at least one TB is configured with a first modulation and coding scheme (MCS) that is different than a second MCS with which the at least one other TB is configured, the at least one TB is associated with a first spectral efficiency that is different than a second spectral efficiency with which the at least one other TB is associated, or the at least one other TB is associated with a first rank that is different than a second rank with which the at least one other TB is associated.

In an aspect of the disclosure, the means for skipping the grant is configured to: refrain from transmitting on the set of resources allocated by the grant.

In an aspect of the disclosure, skipping the grant is based on at least one of: failure to obtain a medium access control (MAC) protocol data unit (PDU) from a MAC buffer, another set of resources allocated to uplink control information (UCI) overlapping with the set of resources allocated by the grant, a radio resource control (RRC) configuration received from the network entity, or a type of the grant.

In an aspect of the disclosure, the apparatus further comprises: means for mapping the data available to be carried on the set of resources into the at least one TB of the at least two TBs, wherein the data size of the data is less than or equal to a first capacity of the at least one TB; and means for refraining from transmitting at least one other TB of the at least two TBs.

In an aspect of the disclosure, the apparatus further comprises: means for mapping uplink control information (UCI) onto the set of resources allocated by the grant; and means for padding each of the at least two TBs, wherein the data size of the data available to be carried on the set of resources is zero, and wherein each of the at least two TBs is transmitted to the network entity.

In an aspect of the disclosure, the apparatus further comprises: means for transmitting, to the network entity, at least one of first information identifying the at least one TB of the at least two TBs onto which the data is mapped or second information indicating a number of the at least one TB of the at least two TBs onto which the data is mapped.

In an aspect of the disclosure, the at least one of the first information or the second information is included in uplink control information (UCI) that is piggybacked on the at least one TB of the at least two TBs.

In an aspect of the disclosure, the determining whether the data size of the data available to be carried on the set resources is sufficient for at least one TB of the at least two TBs is further based on at least one prioritization parameter for a logical channel.

In an aspect of the disclosure, the at least one prioritization parameter for the logical channel comprises at least one of a first prioritization parameter associated with a configured grant or a second prioritization parameter associated with a dynamic grant.

In an aspect of the disclosure, the set of resources is configured on a physical uplink shared channel (PUSCH).

In an aspect of the disclosure, the grant comprises one of a dynamic grant or a configured grant.

In an aspect of the disclosure, an apparatus for wireless communication at a network entity is provided. The apparatus comprises: means for transmitting, to a user equipment (UE), a grant allocating a set of resources on which to transmit at least two transport blocks (TBs) using multiple spatial layers; based on the grant, one of: means for receiving at least one TB of the at least two TBs from the UE on the set of resources, or means for determining the grant is skipped by the UE.

In an aspect of the disclosure, the apparatus further comprises: means for decoding the at least one TB of the at least two TBs to obtain data mapped onto the at least one TB of the at least two TBs, wherein at least one other TB of the at least two TBs includes padding.

In an aspect of the disclosure, at least one of: the at least one TB is associated with a first TB index that is lower than a second TB index with which the at least one other TB is associated, the at least one TB includes uplink control information (UCI) that is absent from the at least one other TB, a first capacity of the at least one TB is greater than a second capacity of the at least one other TB and a data size of the data is greater than the second capacity but less than or equal to the first capacity, the at least one TB is configured with a first modulation and coding scheme (MCS) that is different than a second MCS with which the at least one other TB is configured, the at least one TB is associated with a first spectral efficiency that is different than a second spectral efficiency with which the at least one other TB is associated, or the at least one TB is associated with a first rank that is different than a second rank with which the at least one other TB is associated.

In an aspect of the disclosure, determining the grant is skipped by the UE is based on each of the at least two TBs being absent from the set of resources allocated by the grant.

In an aspect of the disclosure, determining the grant is skipped by the UE is based on at least one of: an absence of a medium access control (MAC) protocol data unit (PDU) from the UE, another set of resources allocated to uplink control information (UCI) overlapping with the set of resources allocated by the grant, a radio resource control (RRC) configuration transmitted to the UE, or a type of the grant.

In an aspect of the disclosure, the means for receiving the at least one TB of the at least two TBs from the UE on the set of resources is configured to: receive the at least one TB of the at least two TBs, wherein a data size of data mapped onto the at least one TB is less than or equal to a capacity of the at least one TB, and wherein an other TB of the at least two TBs is absent from the set of resources allocated by the grant.

In an aspect of the disclosure, the means for receiving the at least one TB of the at least two TBs from the UE on the set of resources is configured to: receive uplink control information (UCI) mapped onto the at least one TB of the at least two TBs, wherein each of the at least two TBs includes padding.

In an aspect of the disclosure, the apparatus further comprises: means for receiving, from the UE, at least one of first information identifying the at least one TB of the at least two TBs onto which data is mapped or second information indicating a number of the at least one TB of the at least two TBs onto which the data is mapped.

In an aspect of the disclosure, the at least one of the first information or the second information is included in uplink control information (UCI) that is piggybacked on the at least one TB of the at least two TBs.

In an aspect of the disclosure, the receiving at least one TB of the at least two TBs from the UE on the set of resources or the determining the grant is skipped by the UE is further based on at least one prioritization parameter for a logical channel.

In an aspect of the disclosure, the apparatus further comprises: the at least one prioritization parameter for the logical channel comprises at least one of a first prioritization parameter associated with a configured grant or a second prioritization parameter associated with a dynamic grant.

In an aspect of the disclosure, the set of resources is configured on a physical uplink shared channel (PUSCH).

In an aspect of the disclosure, the grant comprises one of a dynamic grant or a configured grant.

In an aspect of the disclosure, a computer-readable medium storing computer-executable code for wireless communication at a user equipment (UE) is provided. The code, when executed by a processor, to cause the processor to: obtain a grant allocating a set of resources on which to transmit at least two transport blocks (TBs) using multiple spatial layers; determine whether a data size of data available to be carried on the set resources is sufficient for at least one TB of the at least two TBs; and based on a determination of whether the data size of the data is sufficient for the at least one TB of the at least two TBs, one of: transmit, to a network entity, the at least one TB of the at least two TBs on the set of resources allocated by the grant, or skip the grant.

In an aspect of the disclosure, a computer-readable medium storing computer-executable code for wireless communication at a network entity is provided. The code, when executed by a processor, to cause the processor to: transmit, to a user equipment (UE), a grant allocating a set of resources on which to transmit at least two transport blocks (TBs) using multiple spatial layers; based on the grant, one of: receive at least one TB of the at least two TBs from the UE on the set of resources, or determine the grant is skipped by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
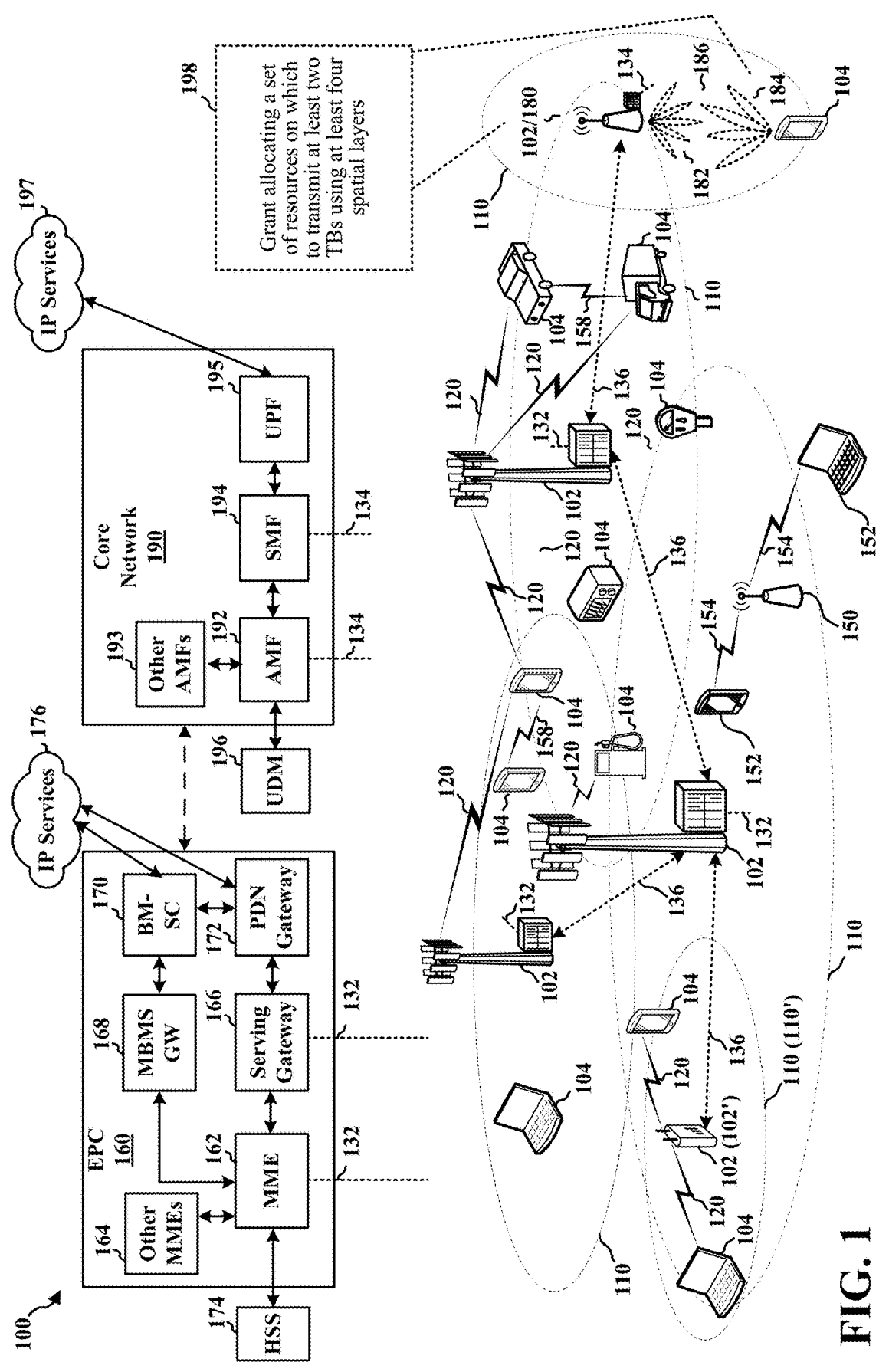
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 134. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cell and macrocells may be known as a heterogeneous network. A heterogeneous network may also include Home Evolved Node Bs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 102' having a small cell coverage area. Some base stations 102, such as gNBs, may operate in a traditional sub-6 GHz (or sub-7 GHz) spectrum, in mmW frequencies, and/or near-mmW frequencies in communication with the UE 104. When such a base station (e.g., gNB) operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

Some base stations may implement the operations of one or both of a base station 102 and a mmW base station 180. For example, some base stations may be capable of operation in multiple bands of multiple frequency ranges, such as FR1 and FR2. According to some aspects of the present disclosure, a base station 102/180 may refer to a base station (including a macro base station or a small cell) configured to operate in one or more bands of a sub-6 GHz (or sub-7 GHz) spectrum (e.g., FR1, 2.4 GHz band, 5 GHz band, 6 GHz band), one or more bands of a mmW or near-mmW spectrum (e.g., FR2, 60 GHz band), or one or more bands of both a sub-6 GHz (or sub-7 GHz) spectrum and a mmW or near-mmW spectrum. In various different aspects, and in some instances depending upon the implementation, a base station 102/180 may include and/or be referred to as a Node B (NB), an evolved NB (eNB), gNodeB (gNB), an access point (AP), a base transceiver station, a radio base station, a radio transceiver, a transceiver function, a basic service set (BSS), an extended service set (ESS), a transmit reception point (TRP), a network node, a network entity, or another similar system or device.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, the UE 104 may be configured to obtain a grant 198 allocating a set of resources on which to transmit at least two transport blocks (TBs) using multiple spatial layers; determine whether a data size of data available to be carried on the set resources is sufficient for at least one TB of the at least two TBs; and based on a determination of whether the data size of the data is sufficient for the at least one TB of the at least two TBs, one of: transmit, to a network entity, the at least one TB of the at least two TBs on the set of resources allocated by the grant, or skip the grant.

Correspondingly, the base station 102/180 may be configured to transmit, to a UE 104, a grant 198 allocating a set of resources on which to transmit at least two TBs using multiple spatial layers; and based on the grant 198, one of: receive at least one TB of the at least two TBs from the UE 104 on the set of resources, or determine the grant is skipped by the UE 104.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
FIG. 2 is a diagram illustrating an example disaggregated base station architecture.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration.

The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figures 3A, 3B, 3C, 3D:
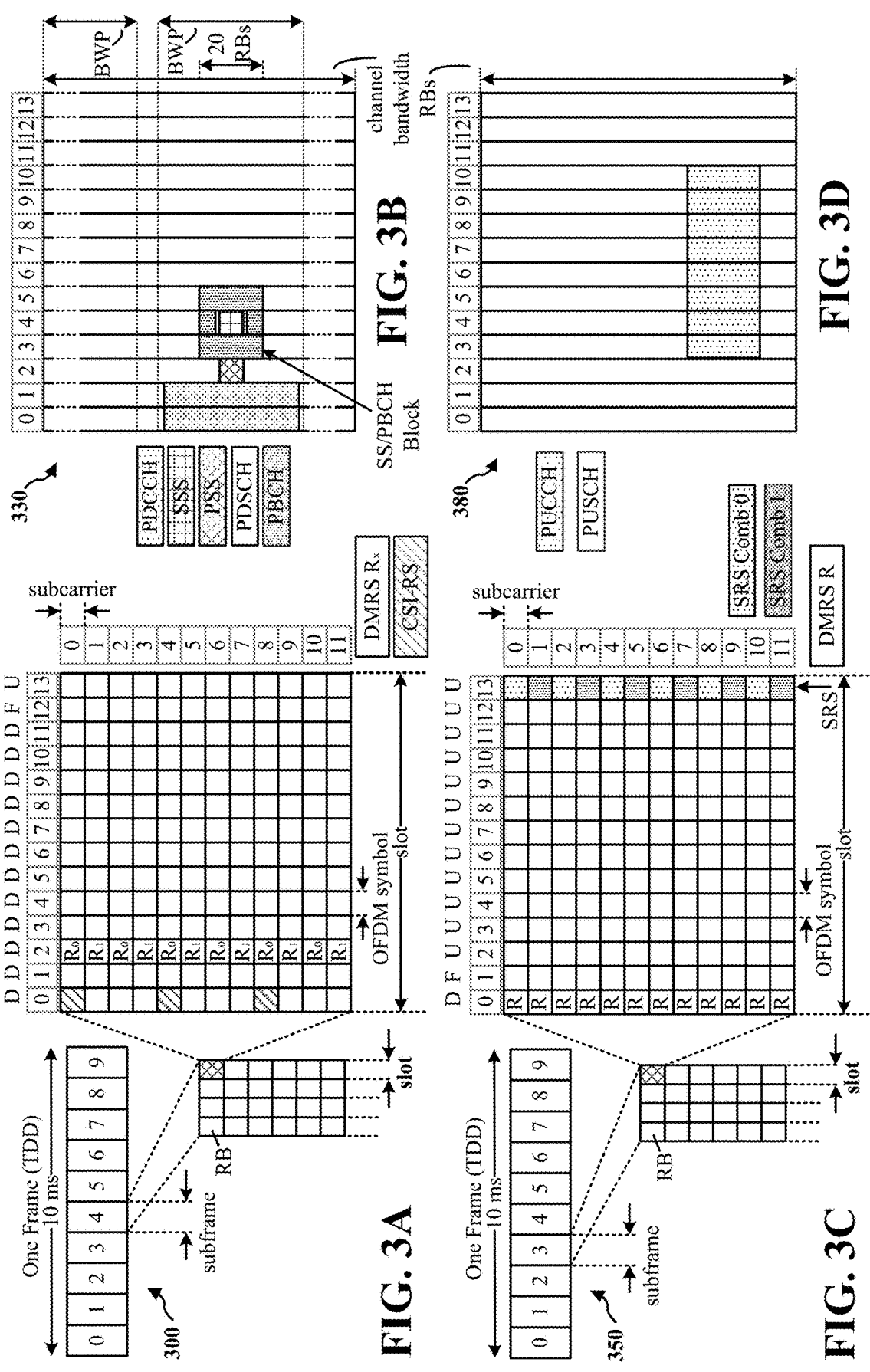
FIG. 3A is a diagram illustrating an example of a first frame, in accordance with various aspects of the present disclosure.
FIG. 3B is a diagram illustrating an example of downlink channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A, 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^{\mu}*15$ kilohertz (kHz), where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100× is the port number, but other DM-RS configurations are possible) and/ or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
FIG. 4 is a diagram illustrating an example of a base station and user equipment (UE) in an access network.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes an SDAP layer, a PDCP layer, an RLC layer, and a MAC layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an iFFT to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using an FFT. The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

In some aspects, at least one of the TX processor 468, the RX processor 456, and the controller/processor 459 may be configured to perform aspects in connection with the grant 198 of FIG. 1.

In some other aspects, at least one of the TX processor 416, the RX processor 470, and the controller/processor 475 may be configured to perform aspects in connection with the grant 198 of FIG. 1.

According to various RATs, such as 5G NR, a UE may transmit a TB on a set of resources (e.g., a set of PUSCH resources) allocated by a grant from the network. Upon reception of the grant, the MAC layer of the UE may generate a MAC protocol data unit (PDU), packaged as a TB, which may include data from a buffer of the MAC. The UE may transmit the TB including the data on a set of resources (e.g., a set of resources on a PUSCH) allocated by the grant.

The foregoing assumes that the UE has determined that that it will transmit the TB to the network according to the grant. In some implementations, however, a UE may be configured to skip an uplink grant—that is, a UE may be configured to ignore the grant and so refrain from transmitting on a set of resources allocated to the UE by a grant. More specifically, a UE having no data (or less than a threshold amount of data) available for transmission at the time of the grant may skip the grant. For example, the MAC buffer of a UE may be empty, and therefore, the UE may lack data that is available to be mapped onto a TB, in which case, the UE may reduce some overhead by skipping the grant rather than transmitting a TB having an empty payload.

In some aspects, a UE may capable of transmitting one TB with up to four spatial layers, e.g., on a PUSCH having support for up to four spatial layers. For example, a UE may obtain a grant on a PUSCH, and in response to the grant, the UE may generate one TB onto which data from a MAC buffer of the UE is mapped. The UE may transmit the one TB on four spatial layers, with all spatial layers being used to transmit the one TB with one modulation and coding scheme (MCS).

Such capabilities expected of a UE for operation in the most recent RANs may constantly evolve, e.g., as the telecommunications standards to which UEs are expected to adhere may be revised multiple times each year. Illustratively, the standards sections directed to MIMO operation may be revised to include uplink DM-RS, SRS, SRS resource indicator (SRI), and/or transmitted precoding matrix indicator (TPMI) (e.g., including codebook) enhancements that would enable 8TX uplink operation to support four or more layers per UE in the uplink, which may be targeting customer premise equipment (CPE), fixed wireless access (FWA), vehicle, industrial, and/or other devices.

One or more of the foregoing enhancements and/or other revisions to various telecommunications standards may support four and more than four layers in a data or shared channel, such as the PUSCH. Such an expansion of the number of supported layers may enable a commensurate expansion to the amount of data that can be conveyed. For example, where a data or shared channel (e.g., PUSCH) has support for four or more than four layers, at least two TBs may be carried on the data or shared channel. Some or all of the at least two TBs may have different MCSs, different redundancy versions (RVs), and so forth.

Such an expansion to the number of TBs that can be carried on the data or shared channel entail some changes to UE behavior, e.g., so that the network is aware of what to expect from UEs in certain situations and is therefore able to respond or otherwise act appropriately.

Thus, a need exists to address the expansion of the number of TBs that can be carried on a data or shared channel, for example, based on a grant allocating resources on the data or shared channel. The present disclosure provides various techniques and solutions related to the expected UE behavior when a UE does not have a sufficient amount of data to transmit on two or more TBs granted on a data or shared channel, UE processes at the PHY and MAC layers upon receiving an uplink grant, mechanisms for different types of grants (e.g., configured grants and dynamic grants), and/or other similar issues that may arise due to some MIMO enhancements to applicable standards.

Figure 5:
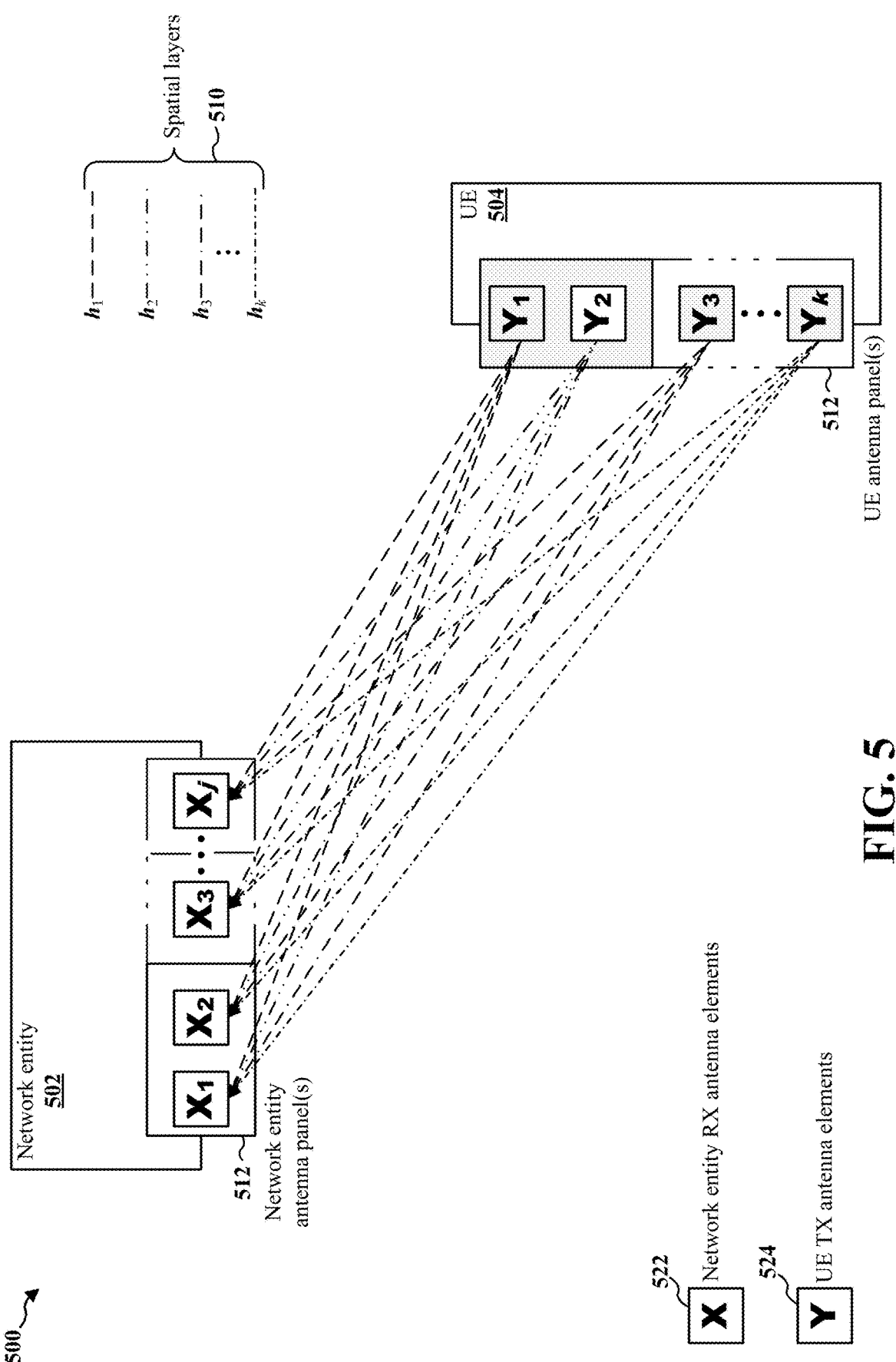
FIG. 5 is a diagram illustrating an example of uplink transmission on multiple spatial layers.

FIG. 5 is a diagram illustrating an example of uplink transmission on multiple spatial layers 510 in a wireless communications environment 500. In some aspects, the UE 504 may be an implementation of one of the UEs 104 or 450 of FIGS. 1 and 4, respectively, and the network entity 502 may be an implementation of one of the base stations 102/180 or 410 of FIGS. 1 and 4, respectively. In some other aspects, the network entity 502 may be an implementation of one or more of the CUs 210, DUs 230, or RUs 240 of FIG. 2.

In various RANs, MIMO operation may be implemented to take advantage of multipath propagation so that the capacity of a radio link can be increased via multiple antenna elements at a network entity and a UE. As illustrated, a network entity 502 may include one or more antenna panels 512 that each include a set of RX antenna elements 522. For example, the network entity 502 may feature up to j RX antenna elements 522 (e.g., j may be equal to 64, 128, 256, or another number). Similarly, the UE 504 may itself have one or more antenna panels 512 that each include a set of TX antenna elements 524—e.g., the UE 504 may have a total of k TX antenna elements 524.

For simplicity and purposes of the present disclosure, the UE 504 may be assumed to include a respective RF chain for each of the k TX antenna elements. In some implementations, however, the UE 504 may include a number of TX antenna elements that is greater than k, but the UE 504 may be configured to contemporaneously transmit or contemporaneously receive on k TX antenna elements due to a limited number of RF chains that the UE 504 is able to contemporaneously activate.

The network entity 502 and the UE 504 may be capable of contemporaneously receiving and contemporaneously transmitting multiple spatial layers 510 via the RX antenna elements 522 and TX elements 524, respectively. Generally, the network entity 502 may have fewer restrictions and/or more relaxed cost and design considerations relative to the UE 504. Such differences may enable a greater number of RX antenna elements 522 to be configured at the network entity 502 than TX antenna elements 524 at the UE 504. Accordingly, the number j of RX antenna elements 522 may exceed the number k of TX antenna elements 524.

While the network entity 502 may include j RX antenna elements 522, the number of spatial layers (or data streams) may be constrained to the number of TX antenna elements 524 at the UE 504. Thus, while the network entity 502 may have the capability to receive up to j spatial layers, the number of spatial layers on which the network entity 502 and the UE 504 are able to communicate may be limited to the number k of TX antenna elements 524 with which the UE 504 is able to communicate at a given time.

Each of the spatial layers 510 may include a point-to-point data stream between one TX antenna element 524 and one RX antenna element 522. In some implementations, the UE 504 may transmit a TB from each of the k TX antenna elements 524, and therefore, there may be k data streams transmitted toward the network entity 502. Correspondingly, the network entity 502 may receive some or all of the k data streams via each of the j RX antenna elements 522.

As described above, various enhancements and evolutions in over the air communication between network entities and UEs, such as enhancements to uplink DM-RS, SRS, SRI, TMPI (including codebook), and so forth, may enable over-the-air communication with four or more than four antenna elements transmitting on an uplink radio link. For example, the UE 504 may be capable of uplink transmission operation using eight antenna elements. In some aspects, the UE 504 may not transmit the same data from all available TX antenna elements; rather, the UE 504 may transmit first data from a first subset of the TX antenna elements 524 and second data from a second subset of the TX antenna elements 524. For example, where k is equal to eight, the UE 504 may transmit a first TB that includes the first data from the first subset of the TX antenna elements 524, but may transmit a second TB that includes the second data from the second subset of the TX antenna elements 524. According to one example in which the UE 504 is configured with eight TX antenna elements 524, the UE 504 may transmit a first TB from a first set of TX antenna elements $Y_1$, $Y_2$, $Y_3$, and $Y_4$, but may transmit a second TB from a second set of TX antenna elements $Y_{k-1}$, $Y_{k-2}$, $Y_{k-3}$, and $Y_k$.

Correspondingly, the network entity 502 may receive the eight streams that include four spatial layers for each of the first TB and the second TB via the j RX antenna elements 522. The first and second TBs, transmitted via a respective set of four spatial layers, may have different MCSs, different RVs, etc. The network entity 502 may be configured to expect such uplink transmissions on multiple spatial layers. However, the network entity 502, and the UE 504, may benefit from some definitions of suitable approaches to handling instances in which the network entity 502 provides a grant to the UE 504 when the UE 504 lacks uplink data to transmit, instances in which the UE 504 has an amount of data to transmit that is insufficient to fill each TB of the at least two TBs, instances in which the network entity 502 provides the UE 504 with a configured grant, instances in which the network entity 502 provides the UE 504 with a dynamic grant, and/or other instances in which the network and/or the UE would benefit from additional information regarding use of a grant when the UE has an insufficient amount of data for the grant.

Figure 6:
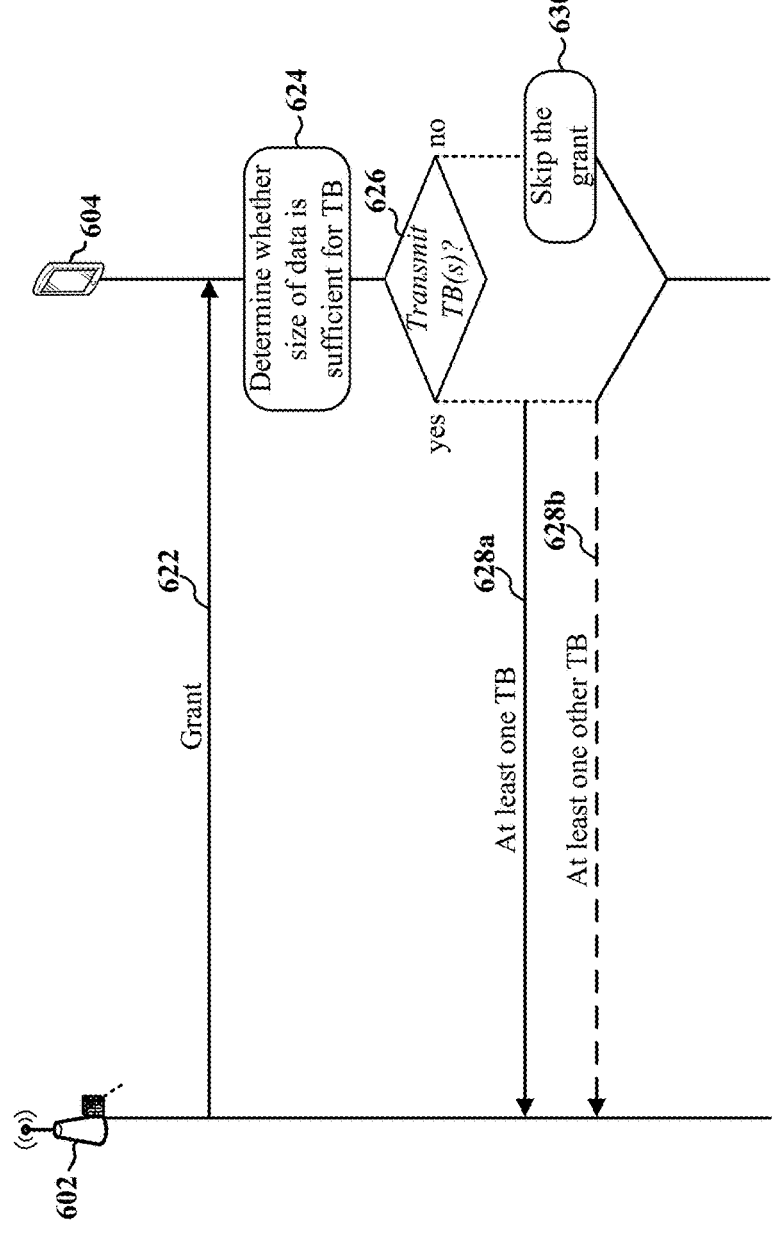
FIG. 6 is a sequence diagram illustrating an example of wireless communication between a network entity and a UE associated with a grant allocating a set of resources on which to transmit at least two TBs using multiple spatial layers.

FIG. 6 is a sequence diagram illustrating an example of wireless communication between a network entity and a UE associated with a grant allocating a set of resources on which to transmit at least two TBs using multiple spatial layers. In some aspects, the UE 504 may be an implementation of one of the UEs 104, 450, or 504 of FIGS. 1, 4, and 5, respectively, and the network entity 502 may be an implementation of one of the base stations 102/180, 410, 502 of FIGS. 1, 4, and 5, respectively. In some other aspects, the network entity 502 may be an implementation of one or more of the CUs 210, DUs 230, or RUs 240 of FIG. 2.

The network entity 602 may allocate, for the UE 604, a set of resources on which to transmit at least two TBs using multiple spatial layers (e.g., 5 to 8 spatial layers). The network entity 602 may allocate the set of resources on a data or shared channel, such as a PUSCH. The network entity 602 may indicate, in a grant 622, one or more of the allocated set of resources, the number of TBs supported on the allocated set of resources, the number of spatial layers supported on the allocated set of resources, and/or other such information that may be used by the UE 604 for an uplink transmission to the network entity 602. The grant 622 may be a configured grant or a dynamic grant.

The network entity 602 may transmit the grant 622 to the UE 604. The UE 604 may receive the grant 622, and based thereon, the UE 604 may determine whether a data size of data available to be carried on the set of resources allocated by the grant is sufficient for at least one TB of the at least two TBs (624). For example, the UE 604 may compare a data size of data available to be carried on the set of resources to a TB size of the at least one TB of the at least two TBs, or the UE 604 may compare the data size to a threshold (e.g., a minimum data size threshold). The UE 604 may determine that the data size is sufficient for the at least one TB if the data size satisfies (e.g., meets or exceeds) the threshold. The UE 604 may determine that the data size is insufficient for the at least one TB if the data size fails to satisfy (e.g., is less than) the threshold.

Based on determining whether the data size of the data available to be carried on the set of resources allocated by the grant is sufficient for at least one TB of the at least two TBs (624), the UE 604 may determine whether to transmit data on at least one of the at least two TBs (626). In some aspects, the network entity 602 may configure some or all of the conditions upon which the determination of whether to transmit data on at least one of the at least two TBs is predicated. For example, the network entity 602 may transmit, and the UE 604 may receive, an RRC signaling message that configures the behaviors of the UE 604 in some instances.

The UE 604 may have three options: fully skipping the grant 622, partially skipping the grant 622, or not skipping (e.g., using) the grant 622. When the UE 604 determines not to transmit data on the at least two TBs, the UE 604 may be fully skipping the grant 622 (630). Fully skipping the grant

622 (630) may include refraining from transmitting on any of the resources allocated by the grant 622. Partially skipping the grant 622 may include transmitting on a portion of the resources allocated by the grant 622, such as by transmitting data mapped to one TB when the grant allocates resources corresponding to two TBs. Not skipping (e.g., using) the grant 622 may include transmitting each of the TBs to which resources allocated by the grant 622 correspond.

In some aspects, the UE 604 may determine not to transmit on any of the TBs to which resources allocated by the grant 622 correspond, and so may fully skip the grant 622 (630), when the UE 604 does not have any data to transmit on the grant 622. For example, where the UE 604 finds an absence of MAC PDUs in a MAC buffer, the UE 604 may determine that there is no data awaiting transmission by the UE 604 and so the grant 622 can be fully skipped.

In some other aspects, the UE 604 may determine not to transmit on any of the TBs to which resources allocated by the grant 622 correspond, and so may fully skip the grant 622 (630), when the UE 604 determines that UCI is overlapping with the resources allocated by the grant. For example, the UE may determine that another set of resources allocated to UCI overlaps with the set of resources allocated on the PUSCH by the grant 622. Where the UE 604 makes such a determination, the UE 604 may skip the grant 622 by skipping TB transmission on the PUSCH; however, the UE 604 may transmit the UCI on the PUCCH. The network entity 602 may configure the UE 604 to fully skip the grant 622 and transmit overlapping UCI on the PUCCH, e.g., via RRC signaling.

In some aspects, the network entity 602 may configure the UE 604 to fully skip the grant 622. For example, the network entity 602 may transmit, and the UE 604 may receive, an RRC signaling message that configures the UE 604 to fully skip the grant 622. According to such a message from the network entity 602, the UE 604 may fully skip the grant 622 (630).

In some aspects, the network entity 602 may separately configure the behavior of the UE 604 for configured grants and dynamic grants. For example, the network entity 602 may configure the UE 604 to fully skip configured grants until otherwise instructed, while also configuring the UE 604 to partially skip dynamic grants (e.g., in which the UE 604 would still transmit at least one TB).

In some aspects, the UE may be configured to either fully skip the grant 622 (630) or transmit at least two TBs 628*a*, 628*b* on the PUSCH. If the UE 604 has data of a data size that is insufficient to completely fill each TB of the at least two TBs, but is sufficient to fill the at least one TB, the UE 604 may pad the other TB (e.g., with zero bits, dummy bits, MAC control elements (CEs) (MAC-CEs), etc.), and the UE may transmit each of the at least two TBs 628*a*, 628*b* to the network entity 602.

In some other aspects, the UE 604 may be configured to transmit each TB 628*a*, 628*b* of the at least two TBs when the UE determines that the data size is sufficient for at least one of the TBs 628*a*, 628*b*. However, the UE 604 may partially skip the grant 622 in some other aspects, such as by transmitting one TB 628*a* of the at least two TBs 628*a*, 628*b* on the PUSCH according to the grant 622 but refraining from transmitting the other TB 628*b* (e.g., when the available data can only fill the one TB 628*a*). In some aspects, the network entity 602 may configure the UE 604 to skip (e.g., partially skip) the grant 622—e.g., the network entity 602 may transmit, to the UE 604 via RRC signaling, a set of RRC parameters that enable or disable skipping of a grant. Alternatively, the UE 604 may fully skip the grant 622 (e.g., when no MAC PDU is obtained from the MAC buffer(s)).

In some such aspects and/or other aspects, the UE 604 may apply a prioritization procedure in which the UE 604 at least one of: (1) prioritizes a first TB of the at least two TBs over a second TB (e.g., where the first TB has a lower TB index than the second TB); (2) where the UE 604 has UCI that is to be piggybacked on a TB 628a of a PUSCH grant, the UE 604 may prioritize the TB 628a having the UCI piggybacked thereon; (3) where respective TB sizes of the two TBs are different from one another, the UE 604 may prioritize one TB 628a over the other 628b based on the respective size of the TBs—e.g., when the data size of the data is insufficient to consume two code blocks but is too large to be mapped onto the other one of the TBs 628b, the UE 604 may prioritize mapping all of the data onto one TB 628a having a capacity to carry all of the data, as opposed to splitting the data up across the one TB 628a and the other TB 628b (however, the UE 604 may prioritize the other (smaller) TB 628b where the other TB 628b has a capacity sufficient to carry all of the data, as doing so may consume less power); (4) the UE 604 may prioritize one TB 628a over another TB 628b based on the TB 628a having at least one of a lower (or larger) MCS, spectral efficiency, and/or rank; (5) the UE 604 may prioritize one TB over another TB based on a respective power with which to transmit each of the TBs (for example, the UE 604 may determine the transmit power—e.g., from transmit power control—for a TB based on the number of RBs of the TB, the MCS of the TB, the number of layers of the TB, and as the at least two TBs 628a, 628b may differ in one or more of the foregoing attributes, the UE 604 may calculate different transmit powers to be used for the first TB 628a and the second TB 628b); or (6) any combination of one or more of the foregoing options (e.g., the UE 604 may prioritize a TB 628a having a larger TB size over another TB 628b having a smaller TB size by mapping data to the selected TB and refraining from mapping data to the other TB in some instances, and if such an approach does not result in one TB being prioritized over the other, the UE 604 may consider another prioritization approach, such as by prioritizing a TB 628a having UCI piggybacked thereon).

In instances in which another set of resources allocated to UCI overlaps with the set of resources allocated to the UE 604 by the grant 622, the UE 604 may one of: (1) fully skip the grant 622 and transmit the UCI on a PUCCH; (2) partially skip the grant 622 and transmit one TB 628a on the PUSCH according to the grant 622, with UCI piggybacked thereon (e.g., the one TB 628a may be a zero-added TB in some instances); or (3) transmit both TBs 628a, 628b on the PUSCH according to the grant 622, and the UCI piggybacked on the PUSCH (e.g., the TBs 628a, 628b may each be zero-padded). In some aspects, the network entity 602 may configure the UE 604 with one of the foregoing three options.

In some aspects in which the UE 604 is capable of and/or configured to perform both full skipping and partial skipping of a grant, the network entity 602 may configure the UE 604 via RRC signaling with a configuration of whether to implement full skipping or partial skipping (or no skipping). The network entity 602 may separately configure the UE 604 for configured grants and dynamic grants (e.g., the network entity 602 may configure the UE 604 to fully skip configured grants, but not skip dynamic grants).

In some aspects, the UE 604 may transmit, and the network entity 602 may receive, information indicating at least one of: the number of TBs 628a, 628b that include actual data, and/or an identifier(s) of a TB (e.g., TB index) that includes actual data if only one TB (or a subset of a set of TBs) includes actual data. For example, where the grant 622 allocates resources corresponding to two TBs, the UE 604 may indicate the TB(s) onto which actual data is mapped via two bits: (1) "10" may indicate that only the first TB is transmitted or only the first TB includes actual data (and by implication, the second TB is not transmitted or the second TB does not include actual data, respectively); (2) "01" may indicate that only the second TB is transmitted or only the second TB includes actual data (and by implication, the first TB is not transmitted or the first TB does not include actual data, respectively); and "11" may indicate that both the first and second TBs are transmitted or both the first and second TBs include actual data. The network entity 602 may use such information to: (1) cancel interference from padded TBs before decoding a TB 628a that includes actual data, (2) only decode the data TB and refrain from decoding the padded TB, (3) refrain from sending a retransmission grant for the padded TB (e.g., if decoding the TB including the actual data fails). With partial skipping, the network entity 602 may use such information to determine how many TBs are contained in the PUSCH, may only attempt to decode the TB(s) that are transmitted by the UE 604 and may refrain from sending a retransmission grant for the TB(s) that is not transmitted by the UE 604.

Some or all of the aforementioned information can be included in UCI that is piggybacked on a PUSCH transmission. For example, the UCI may be piggybacked on UCI that is prioritized according to one of the above mentioned criteria (e.g., one TB may be prioritized over another based on TB index, TB size, spectral efficiency, MCS, rank, etc. The network entity 602 may use such UCI piggybacked on the PUSCH to determine DM-RS information and perform channel estimation for UCI.

In some aspects, the UE 604 may apply some or all logical channel prioritization (LCP) restriction to a PUSCH, based on the number of TBs associated with the PUSCH. For example, an LCP restriction parameter (e.g., maxNumberTBs-PUSCH) may be introduced, which may dictate whether data on a logical channel (LCH) is allowed to be transmitted on a PUSCH grant with two TBs or not. For example, the network entity 602 may configure the UE 604 with at least one respective LCP restriction parameter for each of the logical channels, with an LCP restriction parameter indicating whether data associated with a logical channel can be transmitted on a PUSCH grant with two TBs or not. Illustratively, where an LCP restriction parameter (e.g., maxNumberTBs-PUSCH) restricts data on an LCH L1 to being transmitted on a PUSCH according to a grant allocating one TB, then the UE may be prohibited from using a grant allocating at least two TBs on the PUSCH for transmission of the data on the LCH L1.

However, if the LCP restriction parameter (e.g., maxNumberTBs-PUSCH) allows data on an LCH L2 to be transmitted on a PUSCH according to a grant allocating two TBs, then the UE 604 may use a grant allocating at least two TBs on the PUSCH for transmission of the data on the LCH L2. The number of TBs associated with the PUSCH used for performing the above LCP restriction may be the number of TBs indicated in the grant 622, or the actual number of TBs transmitted in the PUSCH. Illustratively, if the UE 604 decides to perform partial skipping of the grant 622 and only transmit one TB on the PUSCH, then the UE 604 may still include the data in the LCH with the maximum number of TBs on the PUSCH (maxNumberTBs-PUSCH) equal to one, assuming the actual number of TBs on the PUSCH does not cause the LCP restriction parameter to be violated (that is, the UE 604 may use the actual number of TBs on the PUSCH to verify that an LCP restriction parameters is not violated).

As previously described, the UE 604 may be configured by the network entity 602 with separate LCP parameters for maxNumberTBs-PUSCH for dynamic grants and configured grants. For example, then network entity 602 may configure maxNumberTBs-PUSCH for dynamic grants (maxNumberTBs-PUSCH-DG) to be equal to two, but may configure and maxNumberTBs-PUSCH for configured grants (maxNumberTBs-PUSCH-CG) equal to one. According to such an example, data in an LCH cannot be conveyed in 2 TBs on a PUSCH when allocated resources by a configured grant, but such data in the LCH can be conveyed in 2 TBs on a PUSCH when allocated resources by a dynamic grant.

Figure 7:
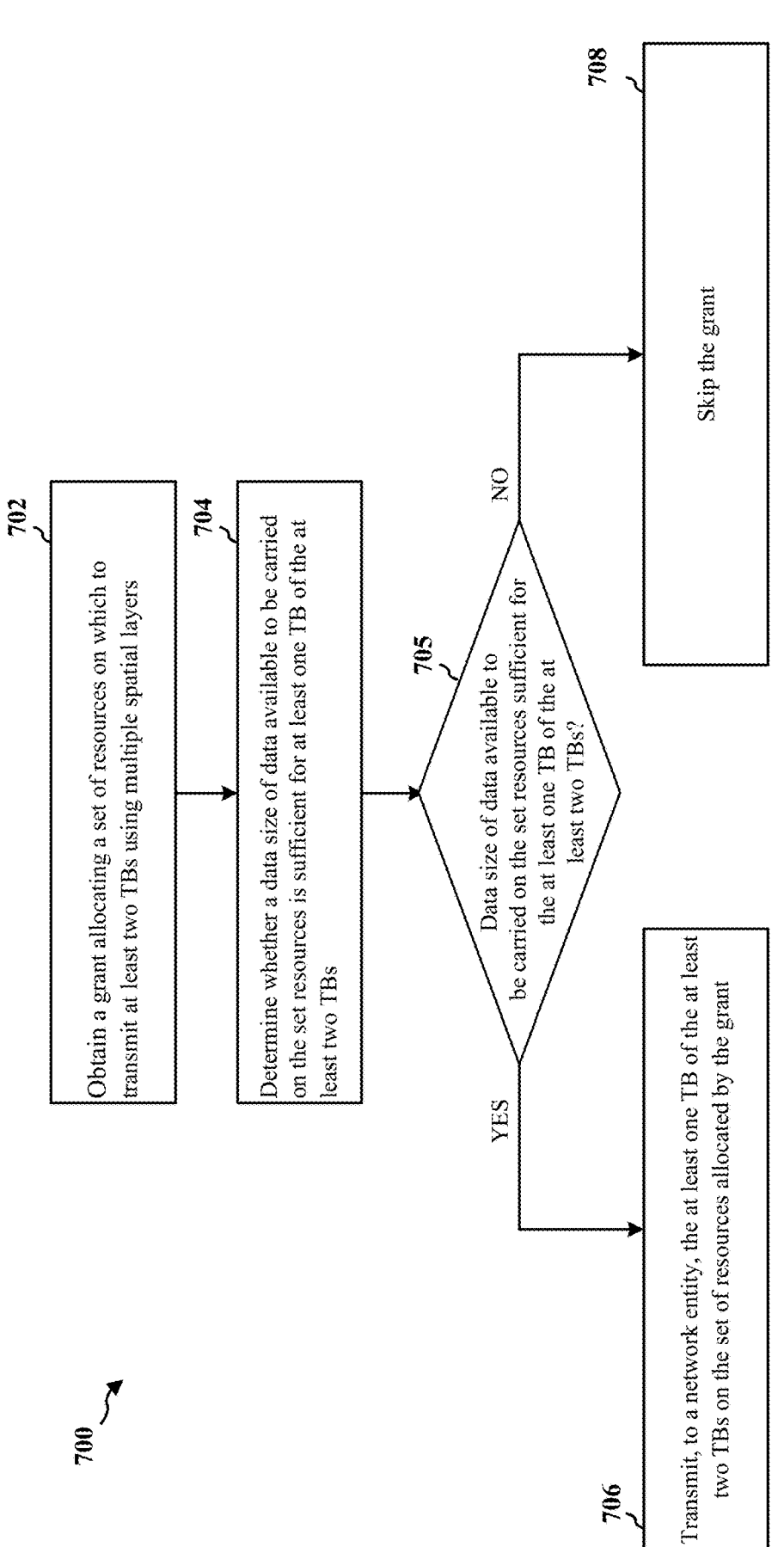
FIG. 7 is a flowchart illustrating an example of a method of wireless communication.

FIG. 7 is a flowchart of a method 700 of wireless communication. The method 700 may be performed by or at a UE (e.g., the UE 104, 450, 504, 604), another wireless communications apparatus, or one or more components thereof. According to various different aspects, one or more of the illustrated operations may be omitted, transposed, and/or contemporaneously performed.

At operation 702, a UE may obtain a grant allocating a set of resources on which to transmit at least two TBs using multiple spatial layers. In some aspects, the set of resources is configured on a PUSCH. In some aspects, the grant includes one of a dynamic grant or a configured grant.

At operation 704, the UE may determine whether a data size of data available to be carried on the set resources is sufficient for at least one TB of the at least two TBs. For example, the UE may compare the data size of the data to a threshold. In some aspects, the threshold may be a TB size of the at least one TB. In some other aspects, the threshold may be a minimum data size for mapping data onto the at least one TB and transmitting the at least one TB that includes the data. In some aspects, the UE may determine, based on the comparison, whether the data size of the data satisfies the threshold (e.g., is greater than or equal to the threshold) or fails to satisfy the threshold (e.g., is less than the threshold). In some further aspects, the UE may be further configured to determine whether a data size of data available to be carried on the set resources is sufficient for at least one TB of the at least two TBs further based on at least one prioritization parameter for a logical channel. For example, the at least one prioritization parameter for the logical channel includes at least one of a first prioritization parameter associated with a configured grant or a second prioritization parameter associated with a dynamic grant.

At 705, if the data size of data available to be carried on the set resources is sufficient for at least one TB of the at least two TBs, then at operation 706, the UE may transmit, to a network entity, the at least one TB of the at least two TBs on the set of resources allocated by the grant. For example, the UE may map the data available to be carried on the set of resources into the at least one TB of the at least two TBs; and the UE may pad at least one other TB of the at least two TBs, and each of the at least two TBs is transmitted to the network entity based on the grant.

According to some aspects, the at least two TBs may be configured such that at least one of: (1) the at least one TB is associated with a first TB index that is lower than a second TB index with which the at least one other TB is associated, (2) the at least one TB includes UCI that is absent from the at least one other TB, (3) a first capacity of the at least one TB is greater than a second capacity of the at least one other TB and the data size of the data is greater than the second capacity but less than or equal to the first capacity, (4) the at least one TB is configured with a first MCS that is different than a second MCS with which the at least one other TB is configured, (5) the at least one TB is associated with a first spectral efficiency that is different than a second spectral efficiency with which the at least one other TB is associated, and/or (6) the at least one other TB is associated with a first rank that is different than a second rank with which the at least one other TB is associated.

In some further aspects, the UE may be configured to map the data available to be carried on the set of resources into the at least one TB of the at least two TBs, and the data size of the data is less than or equal to a first capacity of the at least one TB. However, the UE may refrain from transmitting at least one other TB of the at least two TBs.

In still further aspects, when the data size of the data available to be carried on the set of resources is zero, and each of the at least two TBs is transmitted to the network entity, the UE may map UCI onto the set of resources allocated by the grant, and the UE may pad each of the at least two TBs.

In yet other aspects, the UE may transmit, to the network entity, at least one of first information identifying the at least one TB of the at least two TBs onto which the data is mapped or second information indicating a number of the at least one TB of the at least two TBs onto which the data is mapped. The at least one of the first information or the second information may be included in UCI that is piggybacked on the at least one TB of the at least two TBs.

At 705, if the data size of data available to be carried on the set resources is not sufficient for at least one TB of the at least two TBs, then at operation 708, the UE may skip the grant. For example, the UE may skip the grant by refraining from transmitting on the set of resources allocated by the grant. In some aspects, the UE may skip the grant based on at least one of failure to obtain a MAC PDU from a MAC buffer, another set of resources allocated to UCI overlapping with the set of resources allocated by the grant, a RRC configuration received from the network entity, or a type of the grant.

Figure 8:
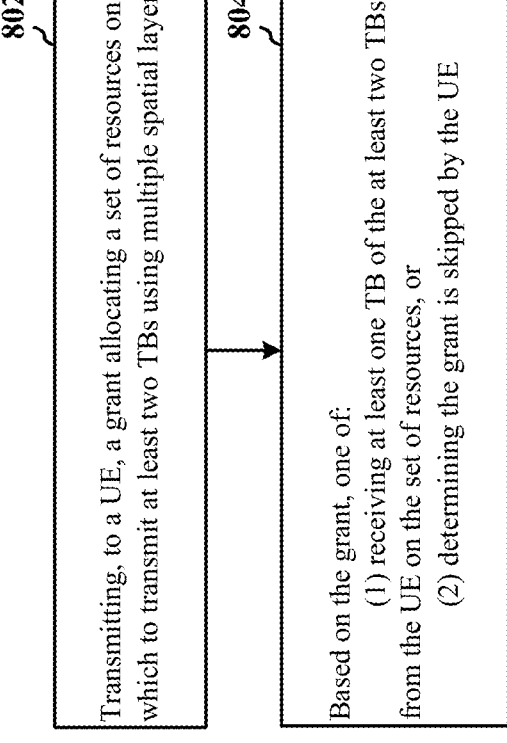
FIG. 8 is a flowchart illustrating another example of a method of wireless communication.
Figure 8:

FIG. 8 is a flowchart of a method 800 of wireless communication. The method 800 may be performed by or at a base station (e.g., the base station 102/180, 410), a network entity (e.g., the network entity 502, 602), another wireless communications apparatus, or one or more components thereof. According to various different aspects, one or more of the illustrated operations may be omitted, transposed, and/or contemporaneously performed.

At operation 802, the base station may transmit, to a UE, a grant allocating a set of resources on which to transmit at least two TBs using multiple spatial layers. In some aspects, the set of resources is configured on a PUSCH. In some aspects, the grant includes one of a dynamic grant or a configured grant.

At operation 804, the base station may be configured to, based on the grant, one of: receive at least one TB of the at least two TBs from the UE on the set of resources, or determine the grant is skipped by the UE. In some aspects, the base station may one of receive at least one TB of the at least two TBs from the UE on the set of resources or determine the grant is skipped by the UE based on at least one prioritization parameter for a logical channel. For example, the at least one prioritization parameter for the logical channel includes at least one of a first prioritization parameter associated with a configured grant or a second prioritization parameter associated with a dynamic grant.

Where the base station receives at least one TB of the at least two TBs from the UE on the set of resources, a data size of data mapped onto the at least one TB may be less than or equal to a capacity of the at least one TB, and another TB of the at least two TBs may be absent from the set of resources allocated by the grant. In some aspects, the base station may receive UCI mapped onto the at least one TB of the at least two TBs, and each of the at least two TBs includes padding.

In some aspects, the base station may receive at least one TB of the at least two TBs from the UE on the set of resources further based on at least one prioritization parameter for a logical channel. For example, UCI may be mapped onto the at least one TB of the at least two TBs, and each of the at least two TBs includes padding.

In some aspects, the base station may decode the at least one TB of the at least two TBs to obtain data mapped onto the at least one TB of the at least two TBs, and at least one other TB of the at least two TBs includes padding. In some aspects, at least one of: (1) the at least one TB is associated with a first TB index that is lower than a second TB index with which the at least one other TB is associated, (2) the at least one TB includes UCI that is absent from the at least one other TB, (3) a first capacity of the at least one TB is greater than a second capacity of the at least one other TB and a data size of the data is greater than the second capacity but less than or equal to the first capacity, (4) the at least one TB is configured with a first MCS that is different than a second MCS with which the at least one other TB is configured, (5) the at least one TB is associated with a first spectral efficiency that is different than a second spectral efficiency with which the at least one other TB is associated, or (6) the at least one TB is associated with a first rank that is different than a second rank with which the at least one other TB is associated.

In still further aspects in which the base station receives at least one TB of the at least two TBs from the UE on the set of resources, the base station may further receive, from the UE, at least one of first information identifying the at least one TB of the at least two TBs onto which data is mapped or second information indicating a number of the at least one TB of the at least two TBs onto which the data is mapped. In some aspects, the at least one of the first information or the second information is included in UCI that is piggybacked on the at least one TB of the at least two TBs.

In some aspects, the base station may determine the grant is skipped by the UE based on each of the at least two TBs being absent from the set of resources allocated by the grant. In some other aspects, the base station may determine the grant is skipped by the UE based on at least one of: an absence of a MAC PDU from the UE, another set of resources allocated to UCI overlapping with the set of resources allocated by the grant, a RRC configuration transmitted to the UE, or a type of the grant.

Figure 9:
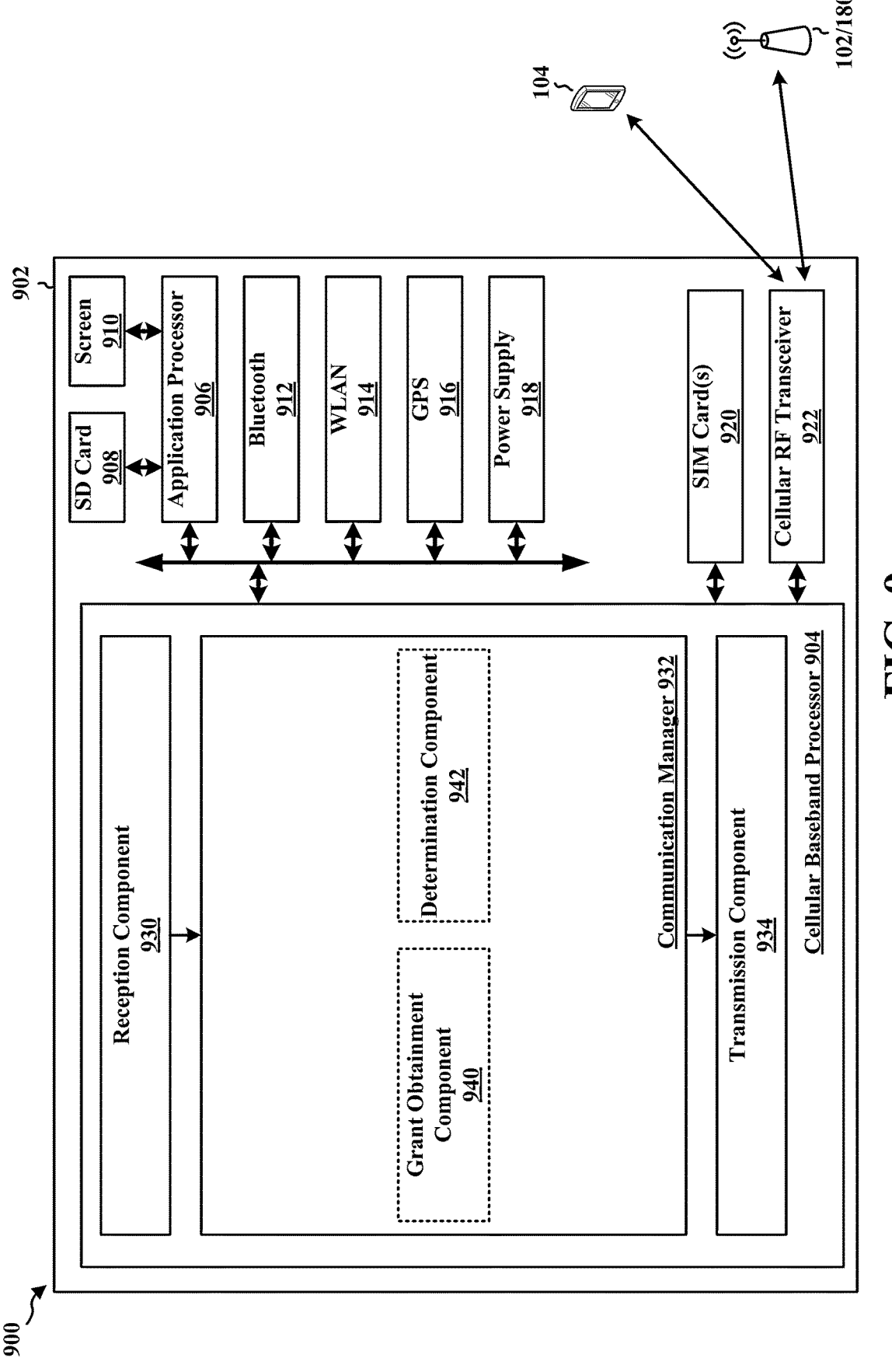
FIG. 9 is a diagram illustrating an example of a hardware implementation for an example apparatus.

FIG. 9 is a diagram 900 illustrating an example of a hardware implementation for an apparatus 902. The apparatus 902 may be a UE or similar device, or the apparatus 902 may be a component of a UE or similar device. The apparatus 902 may include a cellular baseband processor 904 (also referred to as a modem) and/or a cellular RF transceiver 922, which may be coupled together and/or integrated into the same package, component, circuit, chip, and/or other circuitry.

In some aspects, the apparatus 902 may accept or may include one or more subscriber identity modules (SIM) cards 920, which may include one or more integrated circuits, chips, or similar circuitry, and which may be removable or embedded. The one or more SIM cards 920 may carry identification and/or authentication information, such as an international mobile subscriber identity (IMSI) and/or IMSI-related key(s). Further, the apparatus 902 may include one or more of an application processor 906 coupled to a secure digital (SD) card 908 and a screen 910, a Bluetooth module 912, a wireless local area network (WLAN) module 914, a Global Positioning System (GPS) module 916, and/or a power supply 918.

The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 4, the cellular baseband processor 904 may be a component of the UE 450 and may include the memory 460 and/or at least one of the TX processor 468, the RX processor 456, and/or the controller/processor 459. In one configuration, the apparatus 902 may be a modem chip and/or may be implemented as the baseband processor 904, while in another configuration, the apparatus 902 may be the entire UE (e.g., the UE 450 of FIG. 4) and may include some or all of the abovementioned components, circuits, chips, and/or other circuitry illustrated in the context of the apparatus 902. In one configuration, the cellular RF transceiver 922 may be implemented as at least one of the transmitter 454TX and/or the receiver 454RX.

The reception component 930 may be configured to receive signaling on a wireless channel, such as signaling from a base station 102/180 or UE 104. The transmission component 934 may be configured to transmit signaling on a wireless channel, such as signaling to a base station 102/180 or UE 104. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission.

The communication manager 932 may include a grant obtainment component 940 and a determination component 942. The grant obtainment component 940 may obtain a grant allocating a set of resources on which to transmit at least two TBs using multiple spatial layers, e.g., as described in connection with 702 of FIG. 7. In some aspects, the set of resources is configured on a PUSCH. In some aspects, the grant includes one of a dynamic grant or a configured grant.

The determination component 942 may determine whether a data size of data available to be carried on the set resources is sufficient for at least one TB of the at least two TBs, e.g., as described in connection with 704 of FIG. 7. For example, the determination component 942 may compare the data size of the data to a threshold. In some aspects, the threshold may be a TB size of the at least one TB. In some other aspects, the threshold may be a minimum data size for mapping data onto the at least one TB and transmitting the at least one TB that includes the data. In some aspects, the determination component 942 may determine, based on the comparison, whether the data size of the data satisfies the threshold (e.g., is greater than or equal to the threshold) or fails to satisfy the threshold (e.g., is less than the threshold). In some further aspects, the determination component 942 may be further configured to determine whether a data size of data available to be carried on the set resources is sufficient for at least one TB of the at least two TBs further based on at least one prioritization parameter for a logical channel. For example, the at least one prioritization parameter for the logical channel includes at least one of a first prioritization parameter associated with a configured grant or a second prioritization parameter associated with a dynamic grant.

If the data size of data available to be carried on the set resources is sufficient for at least one TB of the at least two TBs, then the transmission component 934 may transmit, to a base station 102/180, the at least one TB of the at least two TBs on the set of resources allocated by the grant, e.g., as described in connection with operation 706 of FIG. 7. For example, the transmission component 934 may map the data available to be carried on the set of resources into the at least one TB of the at least two TBs; and the transmission component 934 may pad at least one other TB of the at least two TBs, and each of the at least two TBs is transmitted to the base station 102/180 based on the grant.

According to some aspects, the at least two TBs may be configured such that at least one of: (1) the at least one TB is associated with a first TB index that is lower than a second TB index with which the at least one other TB is associated, (2) the at least one TB includes UCI that is absent from the at least one other TB, (3) a first capacity of the at least one TB is greater than a second capacity of the at least one other TB and the data size of the data is greater than the second capacity but less than or equal to the first capacity, (4) the at least one TB is configured with a first MCS that is different than a second MCS with which the at least one other TB is configured, (5) the at least one TB is associated with a first spectral efficiency that is different than a second spectral efficiency with which the at least one other TB is associated, and/or (6) the at least one other TB is associated with a first rank that is different than a second rank with which the at least one other TB is associated.

In some further aspects, the transmission component 934 may be configured to map the data available to be carried on the set of resources into the at least one TB of the at least two TBs, and the data size of the data is less than or equal to a first capacity of the at least one TB. However, the transmission component 934 may refrain from transmitting at least one other TB of the at least two TBs.

In still further aspects, when the data size of the data available to be carried on the set of resources is zero, and each of the at least two TBs is transmitted to the base station

102/180, the transmission component 934 may map UCI onto the set of resources allocated by the grant, and the transmission component 934 may pad each of the at least two TBs.

In yet other aspects, the transmission component 934 may transmit, to the base station 102/180, at least one of first information identifying the at least one TB of the at least two TBs onto which the data is mapped or second information indicating a number of the at least one TB of the at least two TBs onto which the data is mapped. The at least one of the first information or the second information may be included in UCI that is piggybacked on the at least one TB of the at least two TBs.

If the data size of data available to be carried on the set resources is not sufficient for at least one TB of the at least two TBs, then the determination component 942 may skip the grant, e.g., as described in connection with operation 708 of FIG. 7. For example, the determination component 942 may skip the grant by configuring the transmission component 934 to refrain from transmitting on the set of resources allocated by the grant. In some aspects, the determination component 942 may skip the grant based on at least one of failure to obtain a MAC PDU from a MAC buffer, another set of resources allocated to UCI overlapping with the set of resources allocated by the grant, a RRC configuration received from the base station 102/180, or a type of the grant.

The apparatus 902 may include additional components that perform some or all of the blocks, operations, signaling, etc. of the algorithm(s) in the aforementioned call flow diagram(s) and/or flowchart(s) of FIGS. 6 and/or 7. As such, some or all of the blocks, operations, signaling, etc. in the aforementioned call flow diagram(s) and/or flowchart(s) of FIGS. 6 and/or 7 may be performed by one or more components and the apparatus 902 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for obtaining a grant allocating a set of resources on which to transmit at least two TBs using multiple spatial layers; means for determining whether a data size of data available to be carried on the set resources is sufficient for at least one TB of the at least two TBs; and based on determining whether the data size of the data is sufficient for the at least one TB of the at least two TBs, one of: means for transmitting, to a network entity, the at least one TB of the at least two TBs on the set of resources allocated by the grant, or means for skipping the grant.

In one configuration, the apparatus 902, and in particular the cellular baseband processor 904, may further include means for mapping the data available to be carried on the set of resources into the at least one TB of the at least two TBs; and means for padding at least one other TB of the at least two TBs, and each of the at least two TBs is transmitted to the network entity based on the grant.

In one configuration, at least one of: the at least one TB is associated with a first TB index that is lower than a second TB index with which the at least one other TB is associated, the at least one TB includes UCI that is absent from the at least one other TB, a first capacity of the at least one TB is greater than a second capacity of the at least one other TB and the data size of the data is greater than the second capacity but less than or equal to the first capacity, the at least one TB is configured with a first MCS that is different than a second MCS with which the at least one other TB is configured, the at least one TB is associated with a first spectral efficiency that is different than a second spectral efficiency with which the at least one other TB is associated, or the at least one other TB is associated with a first rank that is different than a second rank with which the at least one other TB is associated.

In one configuration, the means for skipping the grant is configured to refrain from transmitting on the set of resources allocated by the grant.

In one configuration, skipping the grant is based on at least one of: failure to obtain a MAC PDU from a MAC buffer, another set of resources allocated to UCI overlapping with the set of resources allocated by the grant, a RRC configuration received from the network entity, or a type of the grant.

In one configuration, the apparatus 902, and in particular the cellular baseband processor 904, may further include means for mapping the data available to be carried on the set of resources into the at least one TB of the at least two TBs, and the data size of the data is less than or equal to a first capacity of the at least one TB; and means for refraining from transmitting at least one other TB of the at least two TBs.

In one configuration, the apparatus 902, and in particular the cellular baseband processor 904, may further include means for mapping UCI onto the set of resources allocated by the grant; and means for padding each of the at least two TBs, and the data size of the data available to be carried on the set of resources is zero, and each of the at least two TBs is transmitted to the network entity.

In one configuration, the apparatus 902, and in particular the cellular baseband processor 904, may further include means for transmitting, to the network entity, with at least one of first information identifying the at least one TB of the at least two TBs onto which the data is mapped or second information indicating a number of the at least one TB of the at least two TBs onto which the data is mapped.

In one configuration, the at least one of the first information or the second information is included in UCI that is piggybacked on the at least one TB of the at least two TBs.

In one configuration, the one of transmitting the at least one TB of the at least two TBs on the set of resources allocated by the grant, or skipping the grant is further based on at least one prioritization parameter for a logical channel.

In one configuration, the at least one prioritization parameter for the logical channel includes at least one of a first prioritization parameter associated with a configured grant or a second prioritization parameter associated with a dynamic grant.

In one configuration, the set of resources is configured on a PUSCH.

In one configuration, the grant includes one of a dynamic grant or a configured grant.

The aforementioned means may be one or more of the aforementioned components of the apparatus 902 configured to perform the functions recited by the aforementioned means. As described supra, the apparatus 902 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 10:
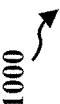
FIG. 10 is a diagram illustrating another example of a hardware implementation for another example apparatus.

FIG. 10 is a diagram 1000 illustrating an example of a hardware implementation for an apparatus 1002. The apparatus 1002 may be a base station or similar device or system, or the apparatus 1002 may be a component of a base station or similar device or system. The apparatus 1002 may include a baseband unit 1004. The baseband unit 1004 may communicate through a cellular RF transceiver. For example, the baseband unit 1004 may communicate through a cellular RF transceiver with a UE 104, such as for downlink and/or uplink communication, and/or with a base station 102/180, such as for IAB.

The baseband unit 1004 may include a computer-readable medium/memory, which may be non-transitory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 410 and may include the memory 476 and/or at least one of the TX processor 416, the RX processor 470, and the controller/processor 475.

The reception component 1030 may be configured to receive signaling on a wireless channel, such as signaling from a UE 104 or base station 102/180. The transmission component 1034 may be configured to transmit signaling on a wireless channel, such as signaling to a UE 104 or base station 102/180. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1032 includes a grant component 1040 and a determination component 1042. The grant component 1040 may be configured to schedule a transmission by the UE 104 on a set of resources, and may be further configured to generate a grant indicating the schedule. The transmission component 1034 may transmit, to the UE 104, a grant allocating a set of resources on which to transmit at least two TBs using multiple spatial layers, e.g., as described in connection with 802 of FIG. 8. In some aspects, the set of resources is configured on a PUSCH. In some aspects, the grant includes one of a dynamic grant or a configured grant.

Based on the grant, one of: the reception component 1030 may receive at least one TB of the at least two TBs from the UE 104 on the set of resources, or the determination component 1042 may determine the grant is skipped by the UE 104, e.g., as described in connection with 804 of FIG. 8. In some aspects, the reception component 1030 may one of receive at least one TB of the at least two TBs from the UE 104 on the set of resources or the determination component 1042 may determine the grant is skipped by the UE 104 based on at least one prioritization parameter for a logical channel. For example, the at least one prioritization parameter for the logical channel includes at least one of a first prioritization parameter associated with a configured grant or a second prioritization parameter associated with a dynamic grant.

Where the reception component 1030 receives at least one TB of the at least two TBs from the UE 104 on the set of resources, a data size of data mapped onto the at least one TB may be less than or equal to a capacity of the at least one TB, and another TB of the at least two TBs may be absent from the set of resources allocated by the grant. In some aspects, the reception component 1030 may receive UCI mapped onto the at least one TB of the at least two TBs, and each of the at least two TBs includes padding.

In some aspects, the reception component 1030 may receive at least one TB of the at least two TBs from the UE 104 on the set of resources further based on at least one prioritization parameter for a logical channel. For example, UCI may be mapped onto the at least one TB of the at least two TBs, and each of the at least two TBs includes padding.

In some aspects, the reception component 1030 may decode the at least one TB of the at least two TBs to obtain data mapped onto the at least one TB of the at least two TBs, and at least one other TB of the at least two TBs includes padding. In some aspects, at least one of: (1) the at least one TB is associated with a first TB index that is lower than a second TB index with which the at least one other TB is associated, (2) the at least one TB includes UCI that is absent from the at least one other TB, (3) a first capacity of the at least one other TB is greater than a second capacity of the at least one other TB and a data size of the data is greater than the second capacity but less than or equal to the first capacity, (4) the at least one TB is configured with a first MCS that is different than a second MCS with which the at least one other TB is configured, (5) the at least one TB is associated with a first spectral efficiency that is different than a second spectral efficiency with which the at least one other TB is associated, or (6) the at least one TB is associated with a first rank that is different than a second rank with which the at least one other TB is associated.

In still further aspects in which the reception component 1030 receives at least one TB of the at least two TBs from the UE 104 on the set of resources, the reception component 1030 may further receive, from the UE 104, at least one of first information identifying the at least one TB of the at least two TBs onto which data is mapped or second information indicating a number of the at least one TB of the at least two TBs onto which the data is mapped. In some aspects, the at least one of the first information or the second information is included in UCI that is piggybacked on the at least one TB of the at least two TBs.

In some aspects, the determination component 1042 may determine the grant is skipped by the UE 104 based on each of the at least two TBs being absent from the set of resources allocated by the grant. In some other aspects, the determination component 1042 may determine the grant is skipped by the UE 104 based on at least one of: an absence of a MAC PDU from the UE 104, another set of resources allocated to UCI overlapping with the set of resources allocated by the grant, a RRC configuration transmitted to the UE 104, or a type of the grant.

The apparatus 1002 may include additional components that perform some or all of the blocks, operations, signaling, etc. of the algorithm(s) in the aforementioned call flow diagram(s) and/or flowchart(s) of FIGS. 6 and/or 8. As such, some or all of the blocks, operations, signaling, etc. in the aforementioned call flow diagram(s) and/or flowchart(s) of FIGS. 6 and/or 8 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, to a UE, a grant allocating a set of resources on which to transmit at least two TBs using multiple spatial layers; and based on the grant, one of: means for receiving at least one TB of the at least two TBs from the UE on the set of resources, or means for determining the grant is skipped by the UE.

In one configuration, the apparatus 1002, and in particular the baseband unit 1004, may further include means for decoding the at least one TB of the at least two TBs to obtain data mapped onto the at least one TB of the at least two TBs, and at least one other TB of the at least two TBs includes padding.

In one configuration, at least one of: the at least one TB is associated with a first TB index that is lower than a second TB index with which the at least one other TB is associated, the at least one TB includes UCI that is absent from the at least one other TB, a first capacity of the at least one TB is greater than a second capacity of the at least one other TB and a data size of the data is greater than the second capacity but less than or equal to the first capacity, the at least one TB is configured with a first MCS that is different than a second MCS with which the at least one other TB is configured, the at least one TB is associated with a first spectral efficiency that is different than a second spectral efficiency with which the at least one other TB is associated, or the at least one TB is associated with a first rank that is different than a second rank with which the at least one other TB is associated.

In one configuration, determining the grant is skipped by the UE is based on each of the at least two TBs being absent from the set of resources allocated by the grant.

In one configuration, determining the grant is skipped by the UE is based on at least one of: an absence of a MAC PDU from the UE, another set of resources allocated to UCI overlapping with the set of resources allocated by the grant, a RRC configuration transmitted to the UE, or a type of the grant.

In one configuration, the means for receiving the at least one TB of the at least two TBs from the UE on the set of resources is configured to receive the at least one TB of the at least two TBs, and a data size of data mapped onto the at least one TB is less than or equal to a capacity of the at least one TB, and an other TB of the at least two TBs is absent from the set of resources allocated by the grant.

In one configuration, the means for receiving the at least one TB of the at least two TBs from the UE on the set of resources is configured to receive UCI mapped onto the at least one TB of the at least two TBs, and each of the at least two TBs includes padding.

In one configuration, the apparatus 1002, and in particular the baseband unit 1004, may further include means for receiving, from the UE, at least one of first information identifying the at least one TB of the at least two TBs onto which data is mapped or second information indicating a number of the at least one TB of the at least two TBs onto which the data is mapped.

In one configuration, the at least one of the first information or the second information is included in UCI that is piggybacked on the at least one TB of the at least two TBs.

In one configuration, the one of receiving at least one TB of the at least two TBs from the UE on the set of resources or determining the grant is skipped by the UE is further based on at least one prioritization parameter for a logical channel.

In one configuration, the at least one prioritization parameter for the logical channel includes at least one of a first prioritization parameter associated with a configured grant or a second prioritization parameter associated with a dynamic grant.

In one configuration, the set of resources is configured on a PUSCH.

In one configuration, the grant includes one of a dynamic grant or a configured grant.

The aforementioned means may be one or more of the aforementioned components of the apparatus 1002 configured to perform the functions recited by the aforementioned means. As described supra, the apparatus 1002 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following examples are illustrative only and may be combined with the various concepts and aspects described herein, without limitation.

Example 1 may be a method of wireless communication at UE, including: obtaining a grant allocating a set of resources on which to transmit at least two TBs using multiple spatial layers; determining whether a data size of data available to be carried on the set resources is sufficient for at least one TB of the at least two TBs; and based on determining whether the data size of the data is sufficient for the at least one TB of the at least two TBs, one of: transmitting, to a network entity, the at least one TB of the at least two TBs on the set of resources allocated by the grant, or skipping the grant.

Example 2 includes the method of Example 1, further including: mapping the data available to be carried on the set of resources into the at least one TB of the at least two TBs; and padding at least one other TB of the at least two TBs, and each of the at least two TBs is transmitted to the network entity based on the grant.

Example 3 includes the method of Example 2, and at least one of: the at least one TB is associated with a first TB index that is lower than a second TB index with which the at least one other TB is associated, the at least one TB includes UCI that is absent from the at least one other TB, a first capacity of the at least one TB is greater than a second capacity of the at least one other TB and the data size of the data is greater than the second capacity but less than or equal to the first capacity, the at least one TB is configured with a first MCS that is different than a second MCS with which the at least one other TB is configured, the at least one TB is associated with a first spectral efficiency that is different than a second spectral efficiency with which the at least one other TB is associated, or the at least one other TB is associated with a first rank that is different than a second rank with which the at least one other TB is associated.

Example 4 includes the method of Example 1, and skipping the grant includes: refraining from transmitting on the set of resources allocated by the grant.

Example 5 includes the method of Example 1, and skipping the grant is based on at least one of: failure to obtain a MAC PDU from a MAC buffer, another set of resources allocated to UCI overlapping with the set of resources allocated by the grant, a RRC configuration received from the network entity, or a type of the grant.

Example 6 includes the method of Example 1, further including: mapping the data available to be carried on the set of resources into the at least one TB of the at least two TBs, and the data size of the data is less than or equal to a first capacity of the at least one TB; and refraining from transmitting at least one other TB of the at least two TBs.

Example 7 includes the method of Example 1, further including: mapping UCI onto the set of resources allocated by the grant; and padding each of the at least two TBs, and the data size of the data available to be carried on the set of resources is zero, and each of the at least two TBs is transmitted to the network entity.

Example 8 includes the method of Example 1, further including: transmitting, to the network entity, at least one of first information identifying the at least one TB of the at least two TBs onto which the data is mapped or second information indicating a number of the at least one TB of the at least two TBs onto which the data is mapped.

Example 9 includes the method of Example 8, and the at least one of the first information or the second information is included in UCI that is piggybacked on the at least one TB of the at least two TBs.

Example 10 includes the method of Example 1, and the one of transmitting the at least one TB of the at least two TBs on the set of resources allocated by the grant, or skipping the grant is further based on at least one prioritization parameter for a logical channel.

Example 11 includes the method of Example 10, and the at least one prioritization parameter for the logical channel includes at least one of a first prioritization parameter associated with a configured grant or a second prioritization parameter associated with a dynamic grant.

Example 12 includes the method of Example 1, and the set of resources is configured on a PUSCH.

Example 13 includes the method of Example 1, and the grant includes one of a dynamic grant or a configured grant.

Example 14 may be a method of wireless communication at a network entity, including: transmitting, to a UE, a grant allocating a set of resources on which to transmit at least two TBs using multiple spatial layers; based on the grant, one of: receiving at least one TB of the at least two TBs from the UE on the set of resources, or determining the grant is skipped by the UE.

Example 15 includes the method of Example 14, further including: decoding the at least one TB of the at least two TBs to obtain data mapped onto the at least one TB of the at least two TBs, and at least one other TB of the at least two TBs includes padding.

Example 16 includes the method of Example 15, and at least one of: the at least one TB is associated with a first TB index that is lower than a second TB index with which the at least one other TB is associated, the at least one TB includes UCI that is absent from the at least one other TB, a first capacity of the at least one TB is greater than a second capacity of the at least one other TB and a data size of the data is greater than the second capacity but less than or equal to the first capacity, the at least one TB is configured with a first MCS that is different than a second MCS with which the at least one other TB is configured, the at least one TB is associated with a first spectral efficiency that is different than a second spectral efficiency with which the at least one other TB is associated, or the at least one TB is associated with a first rank that is different than a second rank with which the at least one other TB is associated.

Example 17 includes the method of Example 14, and determining the grant is skipped by the UE is based on each of the at least two TBs being absent from the set of resources allocated by the grant.

Example 18 includes the method of Example 14, and determining the grant is skipped by the UE is based on at least one of: an absence of a MAC PDU from the UE, another set of resources allocated to UCI overlapping with the set of resources allocated by the grant, a RRC configuration transmitted to the UE, or a type of the grant.

Example 19 includes the method of Example 14, and receiving the at least one TB of the at least two TBs from the UE on the set of resources includes: receiving the at least one TB of the at least two TBs, and a data size of data mapped onto the at least one TB is less than or equal to a capacity of the at least one TB, and an other TB of the at least two TBs is absent from the set of resources allocated by the grant.

Example 20 includes the method of Example 14, and receiving the at least one TB of the at least two TBs from the UE on the set of resources includes: receiving UCI mapped onto the at least one TB of the at least two TBs, and each of the at least two TBs includes padding.

Example 21 includes the method of Example 14, further including: receiving, from the UE, at least one of first information identifying the at least one TB of the at least two TBs onto which data is mapped or second information indicating a number of the at least one TB of the at least two TBs onto which the data is mapped.

Example 22 includes the method of Example 21, and the at least one of the first information or the second information is included in UCI that is piggybacked on the at least one TB of the at least two TBs.

Example 23 includes the method of Example 14, and the one of receiving at least one TB of the at least two TBs from the UE on the set of resources or determining the grant is skipped by the UE is further based on at least one prioritization parameter for a logical channel.

Example 24 includes the method of Example 23, and the at least one prioritization parameter for the logical channel includes at least one of a first prioritization parameter associated with a configured grant or a second prioritization parameter associated with a dynamic grant.

Example 25 includes the method of Example 14, and the set of resources is configured on a PUSCH.

Example 26 includes the method of Example 14, and the grant includes one of a dynamic grant or a configured grant.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
a memory; and
at least one processor coupled to the memory and configured to:
obtain an allocation of a set of resources on which to transmit at least two transport blocks (TBs) using multiple spatial layers;
determine whether a data size of data available to be carried on the set of resources is sufficient for at least one TB of the at least two TBs; and
based on the determination, one of:
transmit the at least one TB of the at least two TBs on the set of resources based on at least one prioritization parameter for a logical channel, wherein the at least one prioritization parameter comprises at least one of a first prioritization parameter associated with a configured grant or a second prioritization parameter associated with a dynamic grant, or
refrain from transmitting on the set of resources.

2. The apparatus of claim 1, wherein the at least one processor is further configured to:
map the data available to be carried on the set of resources into the at least one TB of the at least two TBs; and
pad at least one other TB of the at least two TBs, wherein each of the at least two TBs is transmitted based on the allocation.

3. The apparatus of claim 2, wherein at least one of:
the at least one TB is associated with a first TB index that is lower than a second TB index with which the at least one other TB is associated,
the at least one TB includes uplink control information (UCI) that is absent from the at least one other TB,
a first capacity of the at least one TB is greater than a second capacity of the at least one other TB and the data size of the data is greater than the second capacity but less than or equal to the first capacity,
the at least one TB is configured with a first modulation and coding scheme (MCS) that is different than a second MCS with which the at least one other TB is configured,
the at least one TB is associated with a first spectral efficiency that is different than a second spectral efficiency with which the at least one other TB is associated, or
the at least one other TB is associated with a first rank that is different than a second rank with which the at least one other TB is associated.

4. The apparatus of claim 1, wherein to skip the grant refraining from the transmission is based on at least one of:
failure to obtain a medium access control (MAC) protocol data unit (PDU) from a MAC buffer,
another set of resources allocated to uplink control information (UCI) overlapping with the set of resources,
a radio resource control (RRC) configuration received from a network entity, or
a type of a grant allocating the set of resources.

5. The apparatus of claim 1, wherein the at least one processor is further configured to:
map the data available to be carried on the set of resources into the at least one TB of the at least two TBs, wherein the data size of the data is less than or equal to a first capacity of the at least one TB; and
refrain from transmitting at least one other TB of the at least two TBs.

6. The apparatus of claim 1, wherein the at least one processor is further configured to:
map uplink control information (UCI) onto the set of resources; and
pad each of the at least two TBs, wherein the data size of the data available to be carried on the set of resources is zero, and wherein each of the at least two TBs is transmitted.

7. The apparatus of claim 1, wherein the at least one processor is further configured to:
transmit at least one of first information identifying the at least one TB of the at least two TBs onto which the data is mapped or second information indicating a number of the at least one TB of the at least two TBs onto which the data is mapped.

8. The apparatus of claim 7, wherein the at least one of the first information or the second information is included in uplink control information (UCI) that is piggybacked on the at least one TB of the at least two TBs.

9. The apparatus of claim 1, wherein the set of resources is configured on a physical uplink shared channel (PUSCH).

10. The apparatus of claim 1, wherein the allocation comprises one of a dynamic grant or a configured grant.

11. An apparatus for wireless communication at a network entity, comprising:
a memory; and
at least one processor coupled to the memory and configured to:
transmit, to a user equipment (UE), an allocation of a set of resources on which to transmit at least two transport blocks (TBs) using multiple spatial layers;
based on the allocation, one of:
receive at least one TB of the at least two TBs from the UE on the set of resources based on at least one prioritization parameter for a logical channel, wherein the at least one prioritization parameter comprises at least one of a first prioritization parameter associated with a configured grant or a second prioritization parameter associated with a dynamic grant, or
determine that the UE has refrained from transmitting on the set of resources.

12. The apparatus of claim 11, wherein the at least one processor is further configured to:
decode the at least one TB of the at least two TBs to obtain data mapped onto the at least one TB of the at least two TBs, wherein at least one other TB of the at least two TBs includes padding.

13. The apparatus of claim 12, wherein at least one of:
the at least one TB is associated with a first TB index that is lower than a second TB index with which the at least one other TB is associated,
the at least one TB includes uplink control information (UCI) that is absent from the at least one other TB,
a first capacity of the at least one TB is greater than a second capacity of the at least one other TB and a data size of the data is greater than the second capacity but less than or equal to the first capacity, the at least one TB is configured with a first modulation and coding scheme (MCS) that is different than a second MCS with which the at least one other TB is configured, the at least one TB is associated with a first spectral efficiency that is different than a second spectral efficiency with which the at least one other TB is associated, or the at least one TB is associated with a first rank that is different than a second rank with which the at least one other TB is associated.

14. The apparatus of claim 11, wherein the determination that the UE has refrained from transmitting on the set of resources is based on each of the at least two TBs being absent from the set of resources.

15. The apparatus of claim 11, wherein the determination that the UE has refrained from transmitting on the set of resources is based on at least one of:

an absence of a medium access control (MAC) protocol data unit (PDU) from the UE, another set of resources allocated to uplink control information (UCI) overlapping with the set of resources, a radio resource control (RRC) configuration transmitted to the UE, or a type of a grant allocating the set of resources.

16. The apparatus of claim 11, wherein to receive the at least one TB of the at least two TBs from the UE on the set of resources comprises to:

receive the at least one TB of the at least two TBs, wherein a data size of data mapped onto the at least one TB is less than or equal to a capacity of the at least one TB, and wherein an other TB of the at least two TBs is absent from the set of resources.

17. The apparatus of claim 11, wherein to receive the at least one TB of the at least two TBs from the UE on the set of resources comprises to:

receive uplink control information (UCI) mapped onto the at least one TB of the at least two TBs, wherein each of the at least two TBs includes padding.

18. The apparatus of claim 11, wherein the at least one processor is further configured to:

receive, from the UE, at least one of first information identifying the at least one TB of the at least two TBs onto which data is mapped or second information indicating a number of the at least one TB of the at least two TBs onto which the data is mapped.

19. The apparatus of claim 18, wherein the at least one of the first information or the second information is included in uplink control information (UCI) that is piggybacked on the at least one TB of the at least two TBs.

20. The apparatus of claim 11, wherein the set of resources is configured on a physical uplink shared channel (PUSCH).

21. The apparatus of claim 11, wherein the allocation comprises one of a dynamic grant or a configured grant.

22. A method of wireless communication at a user equipment (UE), comprising:

obtaining an allocation of a set of resources on which to transmit at least two transport blocks (TBs) using multiple spatial layers;

determining whether a data size of data available to be carried on the set of resources is sufficient for at least one TB of the at least two TBs; and based on the determining, one of:

transmitting the at least one TB of the at least two TBs on the set of resources based on at least one prioritization parameter for a logical channel, wherein the at least one prioritization parameter comprises at least one of a first prioritization parameter associated with a configured grant or a second prioritization parameter associated with a dynamic grant, or refraining from transmitting on the set of resources.

23. A method of wireless communication at a network entity, comprising:

transmitting, to a user equipment (UE), an allocation of a set of resources on which to transmit at least two transport blocks (TBs) using multiple spatial layers;

based on the allocation, one of:

receiving at least one TB of the at least two TBs from the UE on the set of resources based on at least one prioritization parameter for a logical channel, wherein the at least one prioritization parameter comprises at least one of a first prioritization parameter associated with a configured grant or a second prioritization parameter associated with a dynamic grant, or determining that the UE has refrained from transmitting on the set of resources.

* * * * *